United States Patent
Smets et al.

[11] Patent Number: 6,047,046
[45] Date of Patent: Apr. 4, 2000

[54] METHOD AND APPARATUS FOR AUTOMATING THE MANAGEMENT OF A DATABASE

[75] Inventors: Raymond J. Smets, Alpharetta; Evan Kraus, Atlanta, both of Ga.

[73] Assignee: BellSouth Intellectual Property Corporation, Wilmington, Del.

[21] Appl. No.: 09/263,475

[22] Filed: Mar. 5, 1999

Related U.S. Application Data

[62] Division of application No. 08/811,895, Mar. 5, 1997, Pat. No. 5,898,760.

[51] Int. Cl.$^7$ .................................................. H04M 1/64
[52] U.S. Cl. ...................... 379/88.25; 707/104; 707/203; 707/530
[58] Field of Search ............................. 379/88.19, 88.21, 379/88.22, 88.23, 88.25, 88.27; 707/1, 104, 2, 200, 203, 100, 3, 4, 530, 540

[56] References Cited

U.S. PATENT DOCUMENTS

| | | | |
|---|---|---|---|
| 5,633,923 | 5/1997 | Kovarik | 379/265 |
| 5,740,230 | 4/1998 | Vaudreuil | 379/93.14 |
| 5,745,755 | 4/1998 | Covey | 395/619 |
| 5,787,415 | 7/1998 | Jacobson et al. | 707/2 |
| 5,946,677 | 8/1999 | Bullen | 707/2 |
| 5,946,691 | 8/1999 | Lee et al. | 707/100 |

Primary Examiner—Fan S. Tsang
Attorney, Agent, or Firm—Jones & Askew, LLP

[57] ABSTRACT

A method and apparatus to automate the process of updating and maintaining a dynamically changing database by assigning status states to each entry within the database and operating on those entries in accordance with the status states. More specifically, when a new entry for the database is received (13) it is classified as a short-term entry (11). If the new entry is accessed (14) prior to the expiration of the short-term status (15), then the classification of the entry is changed to long-term (12). Otherwise, if the short-term status expires (15), the entry is functionally removed from the database (10). Long term entries (12) are maintained within the database for an assigned period of time which attempts to emulate the useful life of the entry. Upon expiration of a long-term status (16), the entry is functionally removed from the database (10).

5 Claims, 5 Drawing Sheets

METHOD AND APPARATUS FOR AUTOMATING THE MANAGEMENT OF A DATABASE

RELATED APPLICATIONS

This is a divisional under 37 C.F.R. §153(b), of prior application Ser. No. 08/811,895, filed Mar. 5, 1997 now U.S. Pat. No. 5,898,760, entitled "Method And Apparatus For Automating The Management of a Database" file on Mar. 5, 1997 on behalf of the inventors Raymond Smets and Evan Kraus, and assigned to BellSouth Corporation, which is incorporated herein by reference. Application Ser. No. 07/936,384 discloses a preferred embodiment of an integrated telecommunications system that can serve as an operational platform of the present invention and is incorporated herein by reference.

TECHNICAL FIELD

The present invention relates to the field of computer databases and in particular, is a method for automatically updating and maintaining a database within a computer-based application.

BACKGROUND OF THE INVENTION

Computer-operated databases are heavily relied upon in many computer automated applications. A few examples of these applications include Automatic Teller Machines, point-of-sale terminals, personal information managers, secured access systems and a variety of telephone network based services. One specific example of a telephone network service that relies upon a computer operated database is the provision of a caller-name announcement service.

A problem that is inherent in many computer-operated databases is that the amount of processing time associated with updating and maintaining the database can be exorbitant. Because databases generally are dynamic, in that the data within the database must be modified periodically, the elimination of this overhead is not feasible. Without being maintained, the data within a database can quickly become obsolete. The bulk of the effort required in maintaining a database is the process of adding new entries into the database and removing entries that are no longer useful. Thus, there is a need to automate the updating process of a database to benefit applications utilizing a computer-operated database.

A specific example of a computer automated application which relies on the use of a computer-operated database is the provision of a caller-name announcement service within a telecommunications network. Caller-name announcement is a recent improvement in calling party identification services similar to what is known as "caller ID". Calling party identification is a technology that allows a called party to identify the originating source of a call prior to answering the call. Typically, an individual must become a subscriber to the calling party identification service and purchase custom equipment. The custom equipment is connected to the subscriber's line and is used to detect and display information which identifies the caller. In operation, when a subscriber's telephone begins to ring, the subscriber can read the display on the caller identification equipment and identify the number and/or the name of the calling party.

In the caller-name announcement service, when a call is received by the phone system, the identification of the calling party is provided by using an announcement message rather than a display. Typically, the announcement message will be an audible recitation of the calling party's name; however, other types of messages can also be utilized. When the subscribing party answers the phone, the announcement message is delivered and the subscriber may be given the opportunity to accept or reject the phone call prior to the parties being connected.

Caller-name announcement service is beneficial over prior calling party identification methods because it does not require the purchase of custom equipment, but rather utilizes standard telephone receiver equipment. In current operation, when a subscriber is called, the calling party will be prompted to recite an identifying message such as the calling party's name. This message is then recorded and delivered to the subscriber when the call is answered. A disadvantage of present caller-name announcement services is that the process of prompting for and receiving the calling party's name is an inefficient utilization of bandwidth. The approximate amount of time required to prompt for and receive the calling party's name is on the order of 8 to 10 seconds. During this holding time, a completed voice channel required. Thus, the time that a channel is dedicated to this process prevents its use for actual communication.

The use of a computer-operated database in conjunction with the caller-name announcement service can operate to alleviate the wasted bandwidth of present caller-name announcement systems. By storing an identifying messages from each caller into a database, the time required to prompt for and receive the identifying messages can be reduced; however, it is readily apparent that the overhead associated with the maintenance of such a database can be significant. The database would have a tendency to grow rapidly because each call from a new party will result in a new entry being created for the database. If there are a large number of one time callers, the database could be filled with information that is never or seldom accessed.

The issues identified with the dynamically changing database are not unique to a caller-name announcement service application. The overhead associated with maintaining a database is common to most computer automated applications. Maintaining a database is a continuous task and usually is the responsibility of a human operator. If the operator is busy or negligent, the database can become unmanageable. Furthermore, the amount of time required in maintaining a database may increase the cost of operating expenses for certain applications. Therefore, there is a need for a method which can automate the maintenance of a computer-operated database. Further, there is a need for a method to minimize the overhead required for maintaining a database.

SUMMARY OF THE INVENTION

The present invention is a method to update automatically or maintain a database. Stated generally, the present invention provides a method to maintain automatically a dynamically changing database by updating infrequently used entries and maintaining frequently used entries. Thus, the present invention is ideally suited for systems that rely on the use of a dynamically changing database but need to avoid the overhead of maintaining the database.

Advantageously, the present invention operates to reduce the overhead required for updating and maintaining a database. Furthermore, the present invention can be adopted to work in a variety of environments that require database maintenance. One such environment is within a caller-name announcement service implemented in an integrated telephone network. Thus, the advantages of using a database to provide services such as caller-name announcements can be exploited while minimizing the resources required to update and maintain the database.

The present invention may be employed in an embodiment that performs maintenance of a general database. In this embodiment, the present invention may exist as a program having access to a database and a timing device which can provide the present date. Each of the entries in the database may include a first reference date and a second reference date. In this embodiment, the present invention operates to update the database by periodically or aperiodically examining the entries within the database. For each entry examined, the entry is removed from the database if (1) the second reference date has not been initialized and the value of the first reference date is earlier than the present date or (2) the value of the second reference date is earlier than the present date. New entries can be received and added to the database. Upon reception of a new entry, the first reference date is equated to the present date plus Y time units and the second reference date is set to a non-initialized value. In one embodiment, Y may range from 1 to 14 days. Finally, this embodiment can also receive and respond to an update command. The update command may be associated with a specific entry in the database and is a request to determine if the entry needs to be updated. The update command will include a search key or identification key for identifying a specific entry in the database. Upon receiving the update command, the database is searched on the search key for the specific entry. If the second reference date for the specific entry has not been initialized and the first reference date for the specific entry is later than the present date, then the second reference date is equated to the present date plus X time units. In one embodiment, X may represent a time duration ranging from 30 to 180 days; however, shorter or longer durations are also anticipated by the present invention. Although specific ranges are provided for the values of X and Y, the present invention is not limited to these ranges.

In a specific embodiment of the present invention, a caller-name announcement database is automatically maintained for a caller-name announcement service being provided within a telecommunications network. Typically, a caller-name database will include several indexed entries. In one embodiment, the indexing can be based on the calling line identification of the originating party. Each of the database entries will include an announcement message and a means to date tag the entries for maintenance purposes. In the preferred caller-name announcement embodiment, two date tags can be used which include a use-by date and a keep-until date.

Initially, the database will not contain an entry for a specific originating directory number. Upon receiving a call from a specific originating directory number, the system will request and receive an announcement message from the originator of the call. After receiving the announcement message, the use-by date tag is initialized to the current date offset by Y time units but the keep-until date is not initialized. In the preferred caller-name announcement embodiment, the offset of Y can range from 1 to 14 days. The entry is then stored into the database indexed by the originating directory number.

For a second call placed to the party from the same originating directory number, the previously stored entry will be retrieved from the database. If the call is received on or before to the use-by date, the keep-until date tag is initialized to the current date offset by X time units and the updated entry is stored into the database. In the preferred embodiment, the offset of X will range from 30 to 180 days. If the call is received after the use-by date, the process identified above for the first call is followed.

For all subsequent calls placed to the party from the same originating directory number, the previously stored entry will be retrieved from the database. If the call is received after the keep-until date, the process identified above for the first call is followed. If the call is receive on or before the keep-until date, the announcement message will be delivered.

In one embodiment of the present invention, the initial reception of the announcement message can be performed by prompting the originating party of the call to recite audibly the announcement message and then to record the announcement message for future use.

In another embodiment of the present invention, the initial announcement message may be retrieved from a list of candidate announcement messages. In this embodiment, the system will prompt the originating party of the call to enter a code. The code will then be used to select a candidate announcement message from the possible selections.

In another embodiment of the present invention, the initial announcement message may be retrieved from a selection of candidate announcement messages based on the calling line identification of the originating directory number. In this embodiment, the selection of candidate announcement messages must be updated by a separate process which stores messages for each possible calling line identification.

The present invention can operate within a telecommunications network which can include the public switched telephone network or a private telephone network. The present invention can operate on a service node within the public switched telephone network, or any other computing device that interfaces to a telephone network.

Therefore, it is an object of the present invention to provide a method to update automatically and maintain a database. One use of this invention can be to enhance a caller-name announcement service operating within a telephone network. Therefore, it is a further object of the present invention to limit the overhead required in providing a caller-name announcement service that utilizes a database.

It is also a further object of the present invention to reduce the amount of bandwidth wasted in providing a caller-name announcement service. This is accomplished by providing a method to balance the amount of times that a calling party must be prompted for and provide the caller-name announcement with the ability to maintain the database.

These and other objects, features, and advantages of the present invention being more clearly understood and appreciated from a preview of the following detailed description of the disclosed embodiments and by reference to the appended drawings and claims.

DETAILED DESCRIPTION

The present invention is a method and apparatus to update automatically and maintain a database and is particularly adaptable for computer systems or applications which rely on the use of dynamically changing databases. The present invention automatically updates a database by adding new entries, refreshing entries that have expired and deleting entries that are obsolete or infrequently used.

Although the present invention may be utilized in a variety of database oriented applications, the operation and feasibility of the present invention will be demonstrated by describing a few specific embodiments. One embodiment of the present invention is an implementation within a caller-name announcement system operating within an integrated telephone network. Another embodiment of the present invention is an implementation within a personal computer based database application. The caller-name announcement embodiment will primarily be described within the context of the Personal Number System (PNS) developed by Bell-South Corporation. Although the PNS generally operates within the public switched telephone network, the applicability of the PNS and the caller-name announcement embodiment of the present invention are not so limited. The caller-name announcement embodiment of the present invention can exist within or without the PNS and may operate within the public phone system, a private phone system or a personal computer which interfaces to a public or private phone system. The personal computer based, database application embodiment will be described in the context of a called-number database application.

General Operation of the Invention

Figure 1:
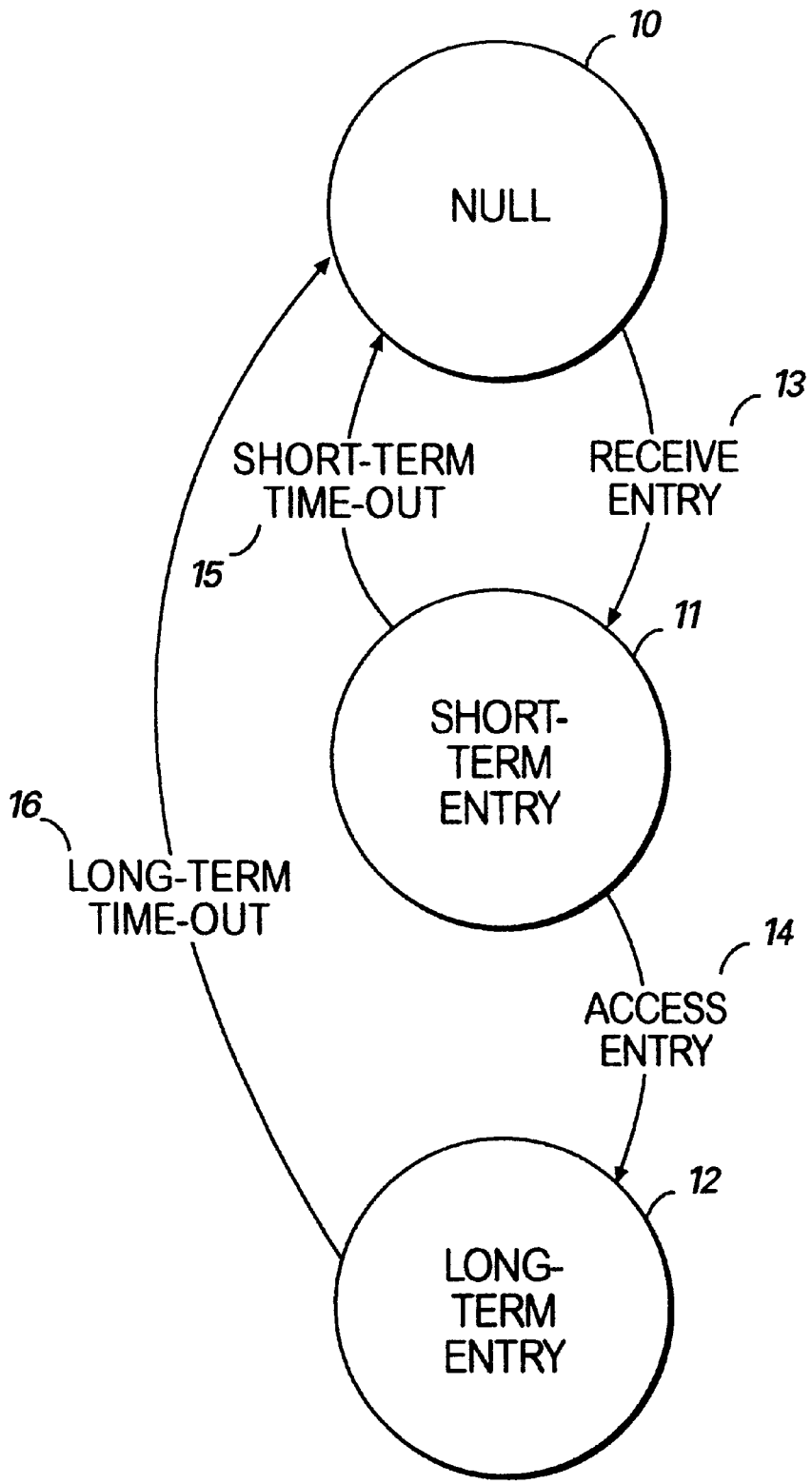
FIG. 1 is a state diagram illustrating the general operation of the present invention.

Referring now to the drawings in which like numerals represent like elements throughout the several figures, the present invention and operable embodiments thereof will be described. FIG. 1 is a state diagram illustrating the general operation of the present invention. Each entry in a database that is maintained by an embodiment of the present invention may be modeled by this state diagram. In its most general sense, the present invention operates to maintain automatically and update the entries in a database in accordance with events that occur pertaining to each entry. Prior to receiving an entry, the state of the database for that entry is in the NULL state 10. Upon the occurrence of the Receive Entry event 13, a new entry is entered into the database. A new entry is given short-term status and the SHORT TERM ENTRY state 11 is activated for that entry. Short term status operates to ensure that data entries that are used infrequently, do not remain in the database. Thus, if an entry is made for the initial occurrence of a Receive Entry event 13, the entry is only maintained in the database if it is accessed within a specified period of time. If the entry is not accessed or used within that period of time, then a Short Term Time Out event 15 occurs which operates to remove, either functionally or actually, the entry from the database and activates the NULL state 10.

If the entry is accessed (Access Entry event 14) prior to the occurrence of a Short Term Time Out event 15, the entry is given a longterm status and the LONG TERM ENTRY state 12 is activated. Long term status operates to maintain an entry in the database for a period of time chosen to represent the useful life of the entry. When the useful life of the entry has expired, a Long Term Time Out event 16 will be issued. An entry that has long-term status will remain in the database until a Long Term Time Out event 16 occurs. The Long Term Time Out event 16 operates to remove, either functionally or actually, the entry from the database and activates NULL state 10. Thus, the short-term status operates to prevent the database from becoming full of entries that are used only once while the long-term status operates to remove items from the database after their useful life has expired.

Figure 2:
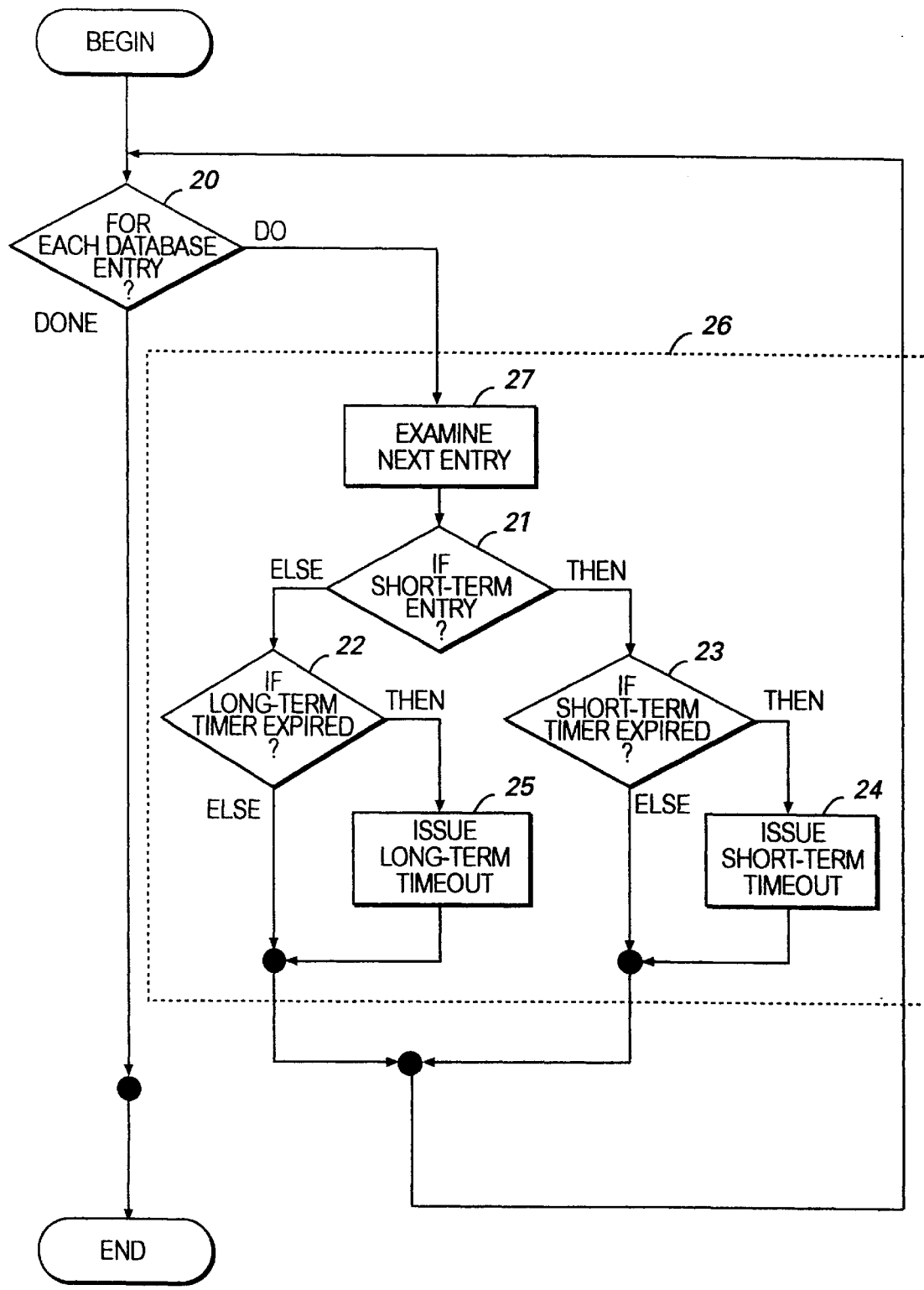
FIG. 2 is a flow chart diagram illustrating an implementation of the time out events for FIG. 1.

Turning now to FIG. 2, a flow chart illustrating a method to implement the Short Term Time Out event 15 and Long Term Time Out event 16 is provided. The algorithm illustrated can be invoked periodically by a timer or other similar mechanisms. Once invoked, for-loop 26 will be executed for each entry in the database. Decision block 20 performs a check to determine if additional entries within the database need to be examined. If the result is positive, process block 27 is entered to examine the next entry within the database. In decision block 21, if the entry has short-term status, the THEN branch will be followed to decision block 23 where it will be determined if the short-term status for the entry has expired. If the short-term status has expired, the THEN branch of decision block 23 will be followed to process block 24 to issue a Short Term Time Out event 15. If the short-term status has not expired, then processing will continue at decision block 20 for the next entry in the database.

In decision block 21, if an entry has long-term status, the ELSE branch will be followed to decision block 22 where it will be determined if the long-term status for the entry has expired. If the long-term status has expired, the THEN branch of decision block 22 is followed to process block 25 where a Long Term Time Out event 16 is issued. If the long-term status has not expired, then processing will continue at decision block 20 with the next entry in the database. Once all entries in the database have been processed, the algorithm is exited.

It should be apparent to the reader that the method disclosed in FIGS. 1 and 2 can be generally applicable to a wide variety of computer based applications. The general maintenance requirements for computer-operated database applications are common in most applications (i.e., adding entries, deleting obsolete entries, refreshing old entries). Therefore, the present invention can be used to provide automated maintenance of computer-operated databases within varying computer applications.

Operation Within PNS and the PSTN

Figure 3:
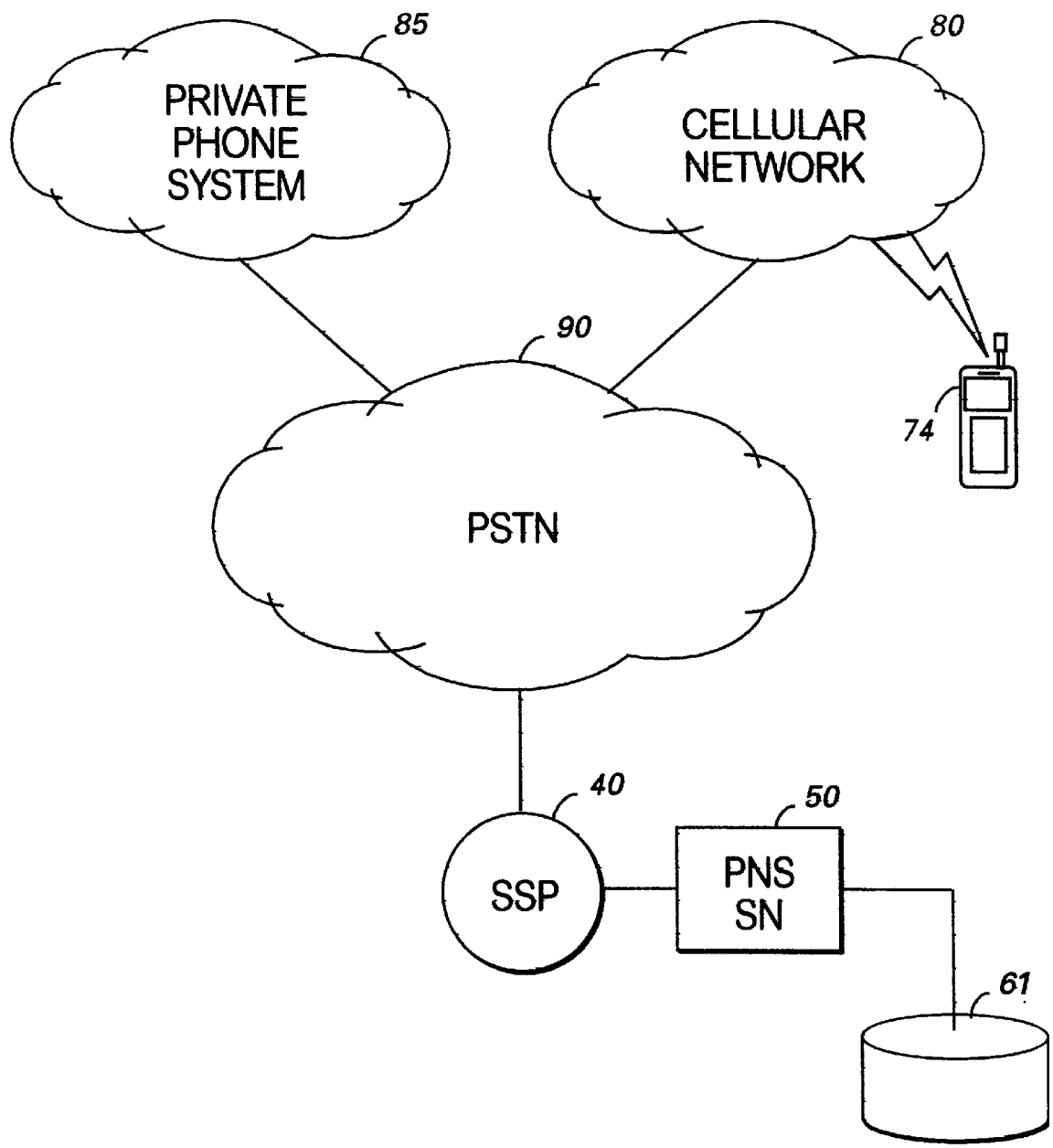
FIG. 3 illustrates an embodiment of the present invention operating within a PNS, caller-name announcement system and interfacing the PSTN.

FIG. 3 is a diagram depicting an embodiment of the present invention operating as an integral part of a Personal Number System (PNS) caller-name announcement service. In this embodiment, a service node 50 having access to database 61 is connected to the PSTN through a service switching point 40. The service node 50 serves as the platform for the PNS. The PSTN interfaces to other telecommunication systems such as the cellular network 80 and private phone systems 85.

The PNS, developed by BellSouth Corporation, provides subscribers with access to various enhanced telephone features and services. One such service is caller-name announcements. In addition, the PNS also operates to provide call routing, single number access, voice mail services, facsimile services, call screening and other miscellaneous services. Each PNS subscriber is provided with a personal number. In order to contact the subscriber through the PNS, an originating party must call the personal number. In general, the operation of the PNS within the public switched telephone network can be described in the following steps:

(1) When a call is placed to a subscriber's personal number service by the PNS on service node 50, a network element within the PSTN 90 will receive the call and route it to the PNS at service node 50.

(2) The PNS will then determine the type of service required for the call, attempt to identify the calling party and prepare a caller-name announcement message for the called subscriber.

(3) Finally, if the call requires routing, a routing list will be retrieved from database 61 and call attempts to the various destinations will be made with caller-name announcements being delivered at each one until the subscriber is located. If the subscriber can not be located, the incoming call will be routed to a default destination such as a voice mail service.

In the caller-name announcement embodiment, a database of caller-name announcements is dynamically created and maintained. When a call is made to a caller-name announcement subscriber, a caller-name announcement is retrieved from the database and used to identify the originating party of the call. If the database does not contain an entry for a particular originating party, the party is requested to provide an announcement message for the database. This message is then stored into the database for use with subsequent calls. Additionally, the announcements stored in the database are refreshed periodically or deleted to ensure that the database remains up-to-date. Utilization of the present invention in a caller-name announcement application has performance advantages over the known art because it operates to minimize the hold-time experienced by callers; makes efficient use of bandwidth, and minimizes the overhead in maintaining a caller-name announcement database.

Figure 4:
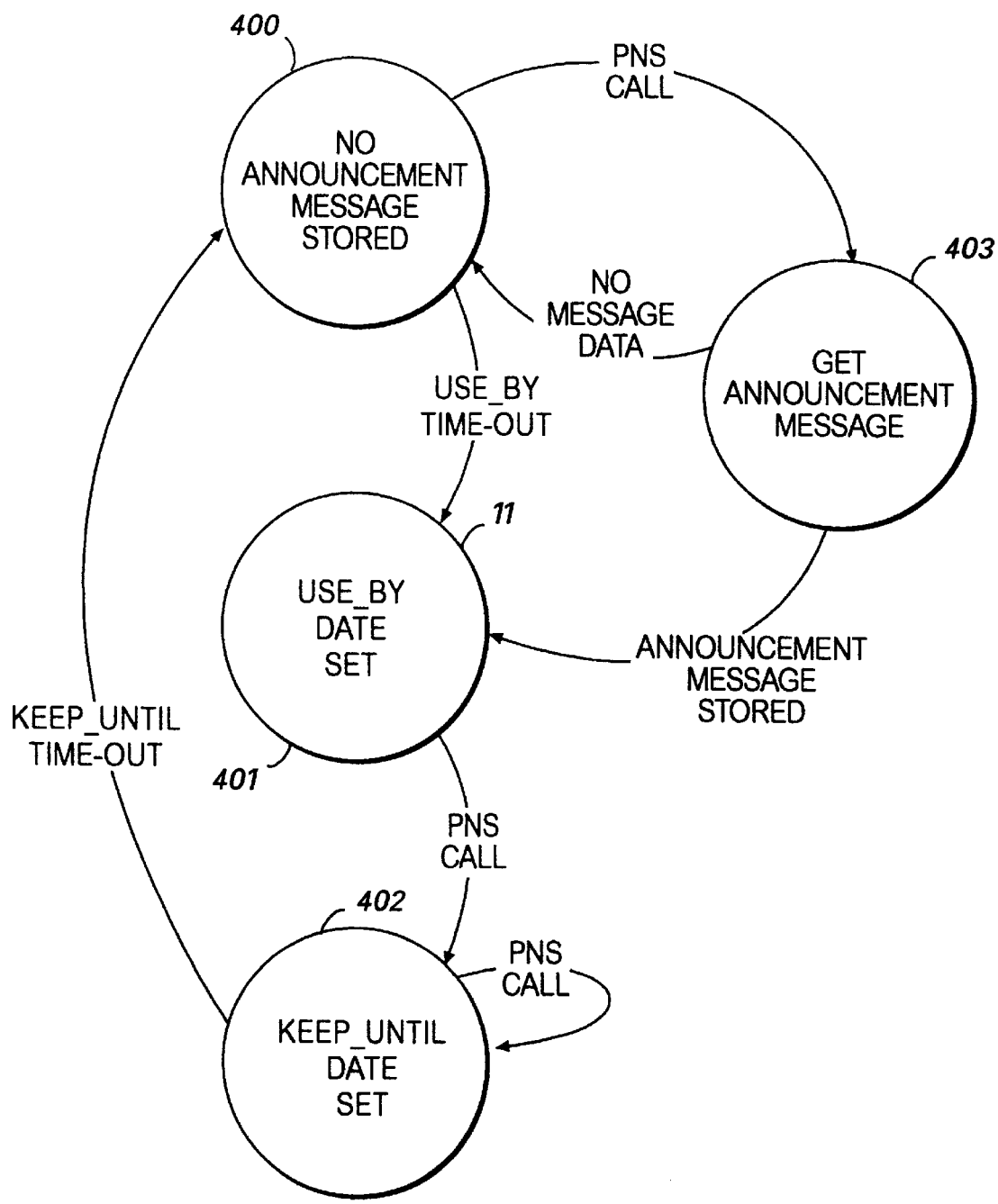
FIG. 4 is a state diagram illustrating the operation of the present invention within a caller-name announcement system.

Now turning to FIG. 4, a state diagram illustrating the embodiment of the present invention within a caller-name announcement system is provided. Three static states, illustrated by solid circles and one dynamic state, illustrated by a broken circle, define the operation of the present invention. The database for this embodiment comprises several caller-name announcement messages that may be indexed by the CLID of the originating line or by some other means. For each announcement message stored in the database, two maintenance mechanisms are included: Use By Date and Keep Until Date. These two mechanisms are analogous to the short-term and long-term status discussed in conjunction with FIG. 1.

The Use By Date is set upon initially receiving and storing a new announcement message. The Use By Date operates to ensure that the database will only maintain announcement messages that are used frequently. Thus, if a subsequent call is not received from the originator or originating line prior to the expiration of the Use By Date, the system will remove the announcement message from the database. The value of the Use By Date field can be set according to the particular requirements of the system. In the preferred embodiment, a value of one (1) to seven (7) days has been chosen.

The Keep Until Date is set when the system determines that the message is frequently used. The message will be maintained in the database until the Keep Until Date expires. The value of the Keep Until Date may vary depending on the specific application of the present invention. In this embodiment, a value of one (1) to six (6) months has been chosen. Although ranges have been provided for the Use By Date and the Keep Until Date, the present invention is not limited to these values and anticipates the use of shorter or longer durations depending upon the specific application.

The states illustrated in FIG. 4 include:

400—No Announcement Message Stored. This state indicates that no announcement message has been received nor is currently stored for a particular originator or originating line.

401—Use By Date Set. This state indicates that an announcement message has been received and stored for the originating line, the Use By Date field has been set to a valid value, and the Keep Until Date field has not been initialized. This state is analogous to the SHORT TERM ENTRY state in FIG. 1.

402—Keep Until Date Set. This state indicates that the announcement message stored for the originating line qualifies as a frequent use announcement message and the Keep Until Date field has been set to a valid value. This state is analogous to the SHORT TERM ENTRY state in FIG. 1.

403—Get Announcement Message. This dynamic state indicates that an announcement message is being requested from the originating party.

The transitions between the states can take one of three forms: PNS call receptions, time out events, and the completion of dynamic state processing. The PNS call reception transitions can only occur during a static state, and result from receiving a PNS call for a particular subscriber. The time out events occur when one of the maintenance mechanisms expires. One method to implement the time out events is the use of a background timing device which autonomously checks the current date against the values of the Use By Date and Keep Until Date. The checks can occur either periodically or aperiodically. Alternative to a background timing device, the values of the Use By Date and Keep Until Date could be examined upon each reception of a PNS call.

Prior to and upon the initial reception of a PNS call, the No Announcement Message Stored state 400 is active. The PNS call causes a transition to the Get Announcement Message state 403. In this state, the originating party is prompted to provide an announcement message to the system. If the process of receiving the announcement message fails, the No Announcement Message Stored state 400 will be re-entered. If an announcement message is received and stored, the Use By Date field is set to a valid value and a transition to the Use By Date Set state 401 occurs. The process of setting the Use By Date field can be accomplished in several ways. A first method is to set the Use By Date field to a date that is X time units in the future from the current date. A second method would be to set the Use By Date to the current date. The operation of both of these methods will be described below.

Two events can occur while the Use By Date Set state 401 is active. First, a Use By Time Out event will occur if the Use By Date expires. If the first method for setting the Use By Date field is employed, the expiration will occur when the current date is equal to or greater than the date stored in the Use By Date field. If the second method is employed, the expiration will occur when the current date is X time units greater than the date stored in the Use By Date field. In either method, if the Use By Date field expires, the announcement message will be removed from the database and a transition to the No Announcement Message Stored state 400 will occur.

The second event that can occur in the Use By Date Set state 401 is the reception of a PNS Call. If this event is received prior to the Use By Time Out event, the Keep Until Date field is set to a valid value and the Keep Until Date Set state 402 is entered. The process of setting the Keep Until Date field can be accomplished similar to the methods for setting the Use By Date field mentioned above.

Two events can occur while the Keep Until Date Set state 402 is active. First, a Keep Until Time Out event will occur if the Keep Until Date field expires. Upon expiration, the announcement message will be removed from the database and a transition to the No Announcement Message Stored state 400 will occur. Secondly, a PNS Call may be received in this state. If a PNS call is received prior to the Keep Until Time Out event, the PNS call is processed and the Keep Until Date Set state 402 remains active.

From the foregoing description, the benefit and adaptability of the present invention to a PNS, caller-name announcement system operating within the PSTN is substantial. This embodiment of the invention is provided solely for illustrative purposes and in no way should limit the scope and applicability of the present invention. The present invention is equally adaptable to caller-name announcement systems operating within the context of private phone systems as well as other platforms.

Operation Within a Personal Computer

Figure 5:
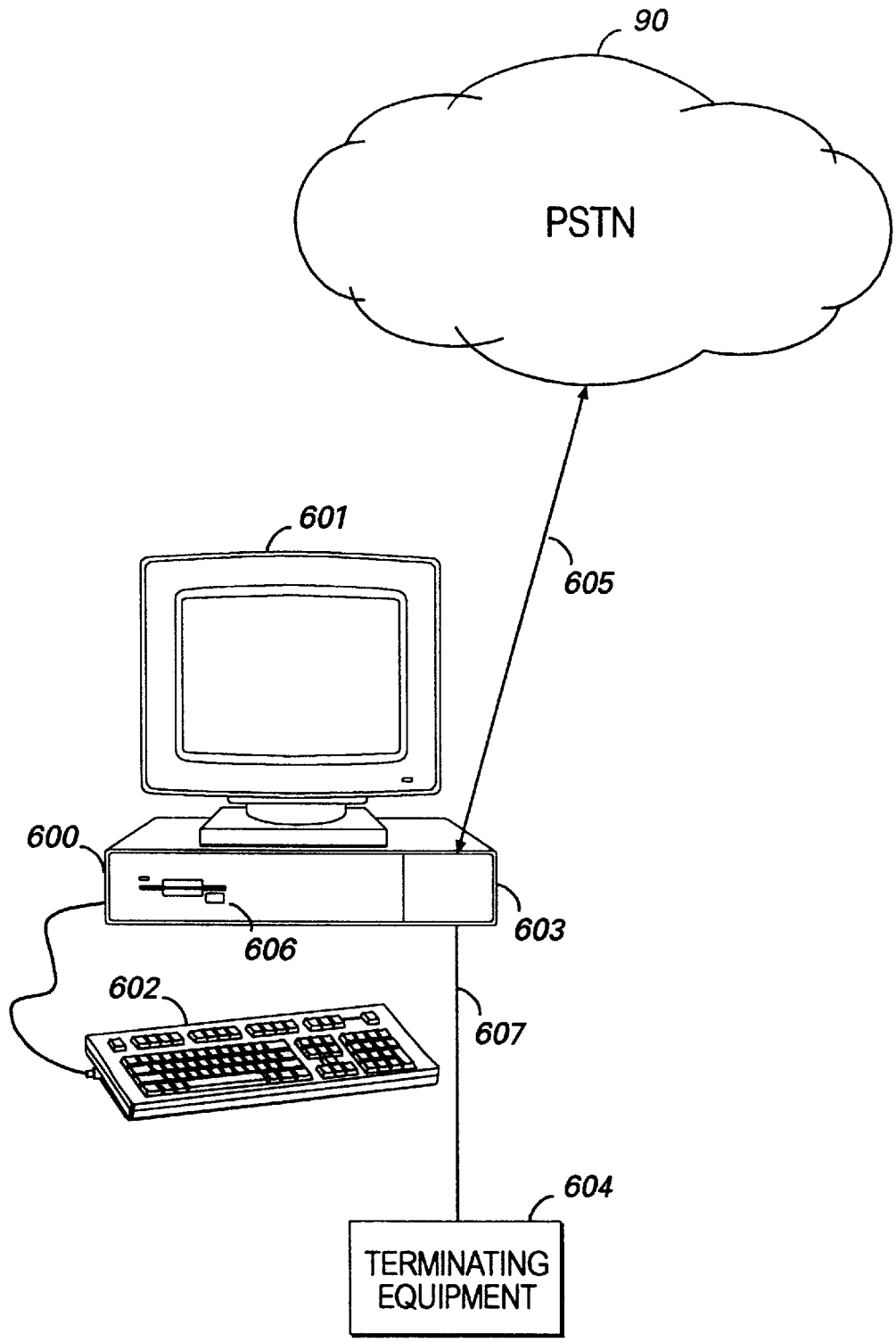
FIG. 5 illustrates another embodiment of the present invention, namely a personal computer interfacing to the PSTN.

Another embodiment of the present invention is illustrated in FIG. 5. Here, a conventional personal computer operates as the platform for a database program. Although the configuration described herein is applicable to a variety of general purpose database programs to which the present invention may be incorporated, a specific embodiment comprising a called-number database computer program will be described. The called-number database computer program operates to maintain a list of directory numbers that have been called by a user or apparatus. The database can then be used as a telephone book of numbers that can be selected and then dialed without requiring the number to be re-entered.

The computer of FIG. 5 consists of the processing unit 600 which interfaces to a storage media 606, a display device 601 and a user input device 602. Access to the public switched telephone network 90 is provided through an interface device 603. The interface device 603 supports at least one access line 605. The access line 605 may consist of any type of interface, including analog or digital interfaces, and may be involved in the process of receiving and transmitting analog or digital data in real-time or otherwise. In addition, a local terminating device 604 may also be connected to the subscriber line through local line 607 and interface device 603.

In this embodiment, a database of called directory numbers is maintained in storage media 606. A computer program running on computer 600 provides an interface to a user or apparatus via display device 601. This interface replaces and emulates the physical interface of a standard telephone. In general, the computer program operates to accept an directory number input by a user or apparatus, store the number into a database, and then initiate a call to the entered number. In addition, the directory numbers that have been stored in the database may be selected by the user or apparatus for subsequent outgoing calls. Thus, the user or apparatus may either enter a new directory number to call or select a directory number from the list of numbers in the database. Once entered or selected, a call attempt to that directory number will be initiated through interface device 603 over access line 605. Once the call has been connected, data can be transferred over the voice channel or termination equipment 604 can be utilized for voice communications.

In operation, when a directory number is entered, the computer program must examine the database to determine if the number is a new entry or an existing entry. Upon determining that the directory number is new, an entry is created in the database for that directory number and the entry is given short-term status. Again, the short-term status operates to ensure that only useful numbers are maintained in the database. Thus, if a directory number with short-term status is not used again prior to the expiration of the short-term status, the directory number will be removed from the database.

If the computer program determines that an entered directory number has previously been stored in the database, the current status of that entry is examined. If the entry has short-term status, it is automatically upgraded to long-term status. If the entry has long-term status, no further database functions are required. In this embodiment, the long-term status again operates to ensure that entries are maintained within the database for their useful life. Once the long-term status expires, the entry is removed from the database. Alternatively, an embodiment may provide a means to inform the user that the long-term status for a particular entry has expired and then give the user the opportunity to renew the entry and hence maintain the number in the database.

Once a directory number has been entered into the database, the computer program provides an interface to the stored directory numbers. Thus, a user or apparatus can directly select a directory number from the database without having to re-enter the directory number. Similar to entered directory numbers, when an entry is selected, the computer program determines the current status for that entry. If the entry has short-term status, it is automatically upgraded to long-term status. If the entry has long-term status, no further database functions are required.

Finally, the computer program has a background task which operates to perform maintenance of the database. Periodically, the entries within the database are examined to determine if their status has expired. If an entry expires, the computer program operates to remove the entry from the database.

From the foregoing description, it will be appreciated that the present invention provides a method to update automatically and maintain a database. Although the present invention has primarily been described in specific embodiments, it is apparent from this specification and it can be appreciated, that the present invention can be utilized in a variety of database applications. Indeed, the present invention is not limited to any particular system or application.

The foregoing method of the present invention may be conveniently implemented in one or more program modules as well as hardware components. The present invention may conveniently be implemented in a programming language such as "C"; however, no particular programming language has been indicated for carrying out the various tasks described above because it is considered that the operation, steps, and procedures described in the specification and illustrated in the accompanying drawings are sufficiently disclosed to permit one of ordinary skill in the art to practice the instant invention. Moreover, in view of the many different types of computers, computer platforms and program modules that can be used to practice the instant invention, it is not practical to provide a representative example of a computer program that would be applicable to these many different systems. Each user of a particular platform would be aware of the language and tools which are more useful for that user's needs and purposes to implement the instant invention.

The present invention has been described in relation to particular embodiments which are intended in all respects to be illustrative rather than restrictive. Those skilled in the art will understand that the principles of the present invention may be applied to, and embodied in, various program modules for execution on differing types of computers or computer platforms regardless of the telephony system that is being supported.

Alternative embodiments will become apparent to those skilled in the art to which the present invention pertains without departing from its spirit and scope. Accordingly, the scope of the present invention is described by the appended claims and supported by the foregoing description.

We claim:

1. In a program module having access to a database of entries, each of said entries comprising a first reference date and a second reference date, and said program module having access to a timing device which provides a present date, a method for updating said database, comprising the steps of:

a. examining a first reference date and a second reference date for a first entry in said database;

b. removing said first entry from said database if said second reference date is not initialized and said first reference date is earlier than said present date;

c. removing said first entry from said database if said second reference date is earlier than said present date; and d. examining a next first reference date and a next second reference for a next entry in said database and repeating steps b–c for said next entry.

2. The program module of claim 1, responsive to receiving a new entry for said database, further comprising the steps of:

equating a new first reference date to said present date plus a predetermined number of time units;

setting a new second reference date to a non-initialized value; and storing said new entry, said new first reference date and said new second reference date in said database.

3. The program module of claim 2, wherein said predetermined number of time units ranges from 1 to 14 days and said equating step further comprises setting said new first reference date for said specific entry to the value of said present date plus said predetermined number of time units.

4. The program module of claim 1, responsive to receiving an update command, said update command being associated with a specific entry in said database, further comprising the steps of:

searching said database for said specific entry; and if a second reference date for said specific entry is not initialized and a first reference date for said specific entry is later than said present date, equating said second reference date for said specific entry to said present date plus a predetermined number of time units.

5. The program module of claim 4, wherein said predetermined number of time units ranges from 30 to 180 days and said equating step further comprises setting said second reference date for said specific entry to said present date plus the said predetermined number of time units.

* * * * *